United States Patent [19]
Horiuchi et al.

[11] Patent Number: 5,759,704
[45] Date of Patent: Jun. 2, 1998

[54] EASILY BIODEGRADABLE COMPOSITE AND DECORATIVE PAPER PRODUCT USED THE SAME

[75] Inventors: Hajime Horiuchi, Fujisawa; Teruo Simizu, Kawachi-machi; Kazuji Nonaka, Satte, all of Japan

[73] Assignee: Takasaki Paper Mfg. Co., Ltd., Takasaki, Japan

[21] Appl. No.: 651,632

[22] Filed: May 22, 1996

[30] Foreign Application Priority Data

May 25, 1995 [JP] Japan ................................. 7-151078
Mar. 22, 1996 [JP] Japan ................................. 8-093280

[51] Int. Cl.⁶ ........................................................ B32B 21/06
[52] U.S. Cl. ........................ 428/535; 428/536; 428/537.5; 428/34.2; 162/148; 106/164.01
[58] Field of Search ............................ 428/534, 535, 428/536, 537.5, 34.2; 162/148; 106/164.01

[56] References Cited

U.S. PATENT DOCUMENTS

| 5,439,010 | 8/1995 | Ross | 131/332 |
| 5,639,518 | 6/1997 | Ando et al. | 427/544 |

FOREIGN PATENT DOCUMENTS

| 7 70996 | 3/1995 | Japan . |
| 8 13368 | 1/1996 | Japan . |

*Primary Examiner*—Christopher Raimund
*Attorney, Agent, or Firm*—Oblon, Spivak, McClelland, Maier & Neustadt, P.C.

[57] ABSTRACT

Disclosed is an easily biodegradable composite formulated with cellulosic fibers of wood pulp and recycled pulp and fiber components of fruits and vegetables, and a paper product obtainable from said composite. The purpose is to provide paper products effectively utilized strained lees of juices being wastes of fruits and vegetables and fruits and vegetables of poor commercial value in the market.

16 Claims, 1 Drawing Sheet

EASILY BIODEGRADABLE COMPOSITE AND DECORATIVE PAPER PRODUCT USED THE SAME

BACKGROUND OF THE INVENTION

The present invention relates to an easily biodegradable composite formulated with cellulosic fibers being raw material of paper and fiber components of fruits etc., paper and paperboard made using it, tablewares and packaging containers converted using these paper and paperboard, and various vessels obtainable by molding said easily biodegradable composite.

For conventional paper and paperboard, printing or dye etc. are used to afford the decorativeness in most instances. By using strained lees of apple, carrot, etc. in the papermaking process, however, the decorativeness is afforded automatically by colors contained in those fruits and vegetables and patterns formed with lees, thereby printing or dye etc. need not to be used and environmentally and economically superior products can be obtained.

Moreover, most of the papers and paperboards used for various packaging containers are utilizing wood pulp and recycled pulp. On disposing of them in landfill, the biodegradation is relatively slow and, in addition, petroleum-based resins are sometimes added to obtain the hardness and strength of paper, making the biodegradation more difficult by doing so.

Replacing said plastic materials that degrade difficultly and generate a large quantity of heat on incineration, thus leading to one of the causes of environmental destruction, an easily biodegradable composite, which has easy biodegradability, allows incinerating disposal similarly to wood pulp and exhibits higher strength compared with usual wood pulp products, and paper and paper products with decorativeness by themselves that used said composite have been developed according to the invention.

SUMMARY OF THE INVENTION

In the easily biodegradable composite of the invention, one kind or two or more kinds of fiber components of fruits and vegetables are formulated to cellulosic fibers. In this case, as the cellulosic fibers, wood pulp and recycled pulp are used, and as the fruits and vegetables, apple, citrus, carrot, tomato, cabbage, celery, etc. are used, but it is particularly effective to use strained lees rejected from production plants commercially producing juices of fruits and vegetables for the fiber components.

Moreover, others of the invention include single ply paper or multiply paperboard such as corrugated board produced using said easily biodegradable composite and molded vessels obtainable by molding using said easily biodegradable composite. Furthermore, others of the invention include paper products such as tablewares, paper containers and packaging vessels like corrugated board case obtainable by converting those paper and paperboard. And, at this time, the formulating proportion of the fibers of fruits and vegetables in the easily biodegradable composite is preferable to be 50% or less by weight. Besides, in the case of paperboard, it is effective to make the paper of at least top layer to be paper comprising said easily biodegradable composite.

Further, the method of producing the inventive paper or paperboard is a usual papermaking process, using said easily biodegradable composite.

DETAILED DESCRIPTION OF THE INVENTION

First, a typical procedure for obtaining the easily biodegradable composite will be described. As the cellulosic fibers, wood pulp or recycled pulp is used and, as the fibers of fruits and vegetables, strained lees of juices from which skin and seeds were removed are used. The strained lees of juice and water are added to that wood pulp or recycled pulp and mixed to obtain a suspension-like (slurry-like) mixture. This mixture is the easily biodegradable composite, which becomes raw materials of paper, paperboard and molded vessels.

Figure 1:
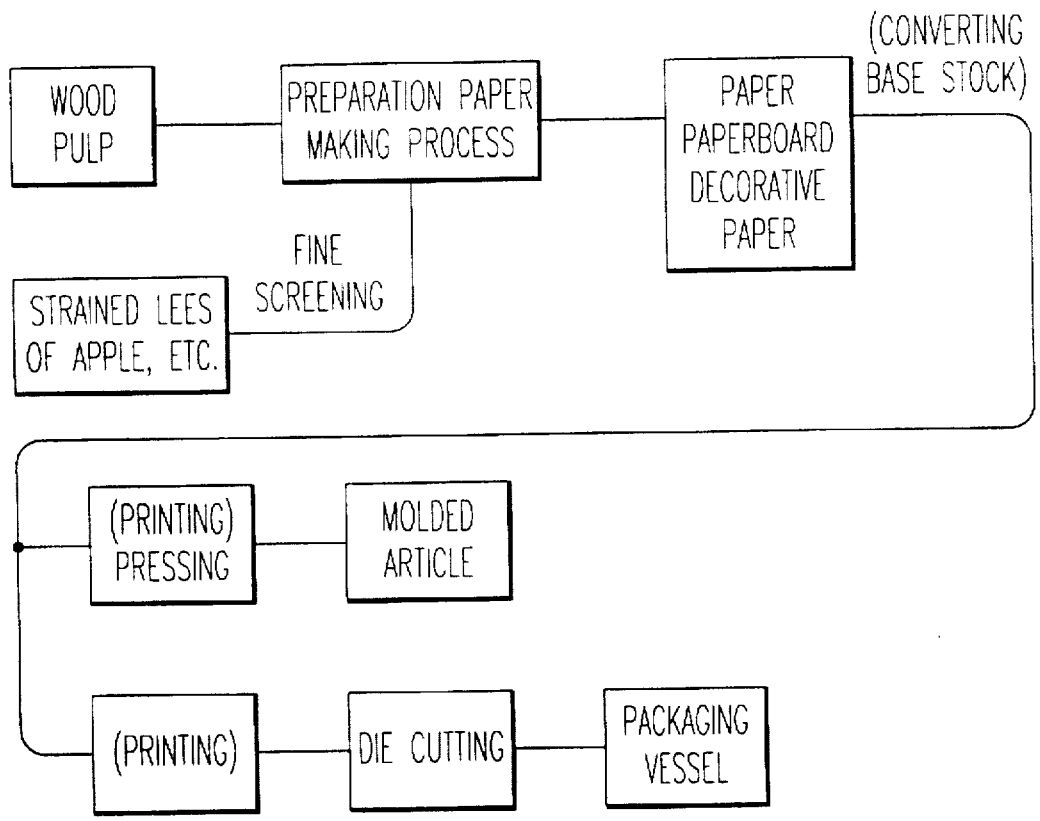
FIG. 1 is a flow sheet showing the production process of the inventive paper, paperboard and paper products obtainable by using these as converting base stocks.

Next, for obtaining the easily biodegradable paper and paperboard, as shown in FIG. 1, using wood pulp and/or recycled pulp and juice lees from which skin and seeds of fruits and vegetables were removed as raw materials, single ply paper or multiply paperboard is produced on a conventional paper machine. And, in the case of paperboard, it is possible to make the overall or partial particular layer(s) to be paper layer(s) comprising the easily biodegradable mixture mixed with said strained lees of juice and the other layer(s) to be paper layer(s) comprising usual pulp etc. Further, the paper, paperboard, etc. produced in this way are molded as they are or after figured on the surface by printing using them as converting base stocks, thereby paper products such as tablewares, paper boxes and various packaging vessels like corrugated board case are obtained.

These papers comprising the easily biodegradable composite have higher strength compared with papers comprising usual pulp, and, with natural color given by liquid component of strained lees of juice and pattern to be formed by fiber component, a decorative design is formed naturally on the surface of paper. In the case of multiply paperboard, therefore, even if it may be paperboard comprising usual pulp in appearance when provided the paper layer of easily biodegradable composite inside, one with higher strength can be obtained. Also, when using the easily biodegradable composite for the top layer, paperboard with decorativeness can be obtained without printing process. Besides, in both cases, printing can be provided additionally.

Figure 2:
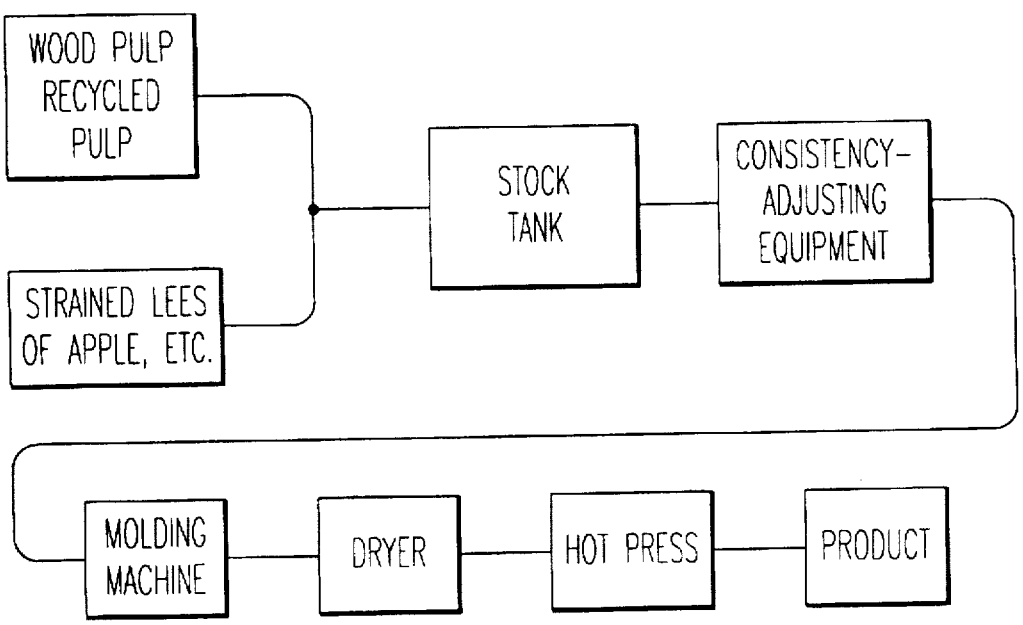
FIG. 2 is a flow sheet showing the production process of the inventive molded vessels.

Next, for obtaining the molded vessel, as shown in FIG. 2, a slurry-like easily biodegradable composite by mixing the strained lees of juice from which skin and seeds were removed with the suspension of fine screened wood pulp or recycled pulp is prepared. After adjusted the consistency, this slurry-like composite is molded into an appropriate mold with molding machine in the state of reduced pressure. This molded article is taken off from the metal mold, dried in a dryer and applied to a hot press to obtain a final molded vessel.

The formulating proportion of fibers of fruits and vegetables in the easily biodegradable composite of the invention is preferable to be 50% or less by weight. If this formulating proportion exceeds 50% by weight, the dimensional change sometimes becomes too large when made up the products or the cracking occurs during molding. Besides, with increasing formulating proportion of said fiber component, the hardness of products such as paper and molded articles obtained increases and the strength also improves. This is considered because of that said fiber component plays a role of binder between cellulose fibers.

In following, the invention will be illustrated more based on the examples.

EXAMPLE 1

According to the preparing method of handsheet for testing pulp designated in JIS P8209, handsheets were made as follows: Namely, in a standard disintegrator with volume of 3.4 liters, lees of apple juice from which foreign matters such as seeds were removed were formulated to hardwood pulp in the proportions by dry weight as shown in Table 1 and water was added, each of which was mixed and disintegrated well. Then, the stocks were diluted to a consistency of 0.15% and, after handsheets were made on a handsheet apparatus, targeting a basis weight of 150 g/m², they were dewatered with press and dried to obtain aiming handsheets.

And, with the handsheets thus obtained, compressive strength test was performed according to JIS P8126, and the results are shown in Table 1. Moreover, for examining the biodegradability of these handsheets, each handsheet was buried in the soil and observed every 10 days to determine the number of days until the shape was collapsed. The results are put down in Table 1.

Besides, for comparison, handsheet of 100% conventional hardwood pulp was made similarly as above and the compressive strength and biodegradability were examined similarly, the results of which are shown in Table 1.

TABLE 1

| | Proportion of juice lees (%) | Basis weight (g/m²) | Compressive strength Found (kg) | Compressive strength Ratio | Biodegradability (day) |
|---|---|---|---|---|---|
| Inventive example 1 | 15 | 167 | 21.4 | 171 | ca. 100 |
| Inventive example 2 | 25 | 164 | 26.5 | 212 | ca. 90 |
| Inventive example 3 | 50 | 163 | 34.4 | 275 | ca. 70 |
| Conventional example | 0 | 169 | 12.5 | 100 | ca. 110 |

From Table 1, it is evident that, according to the invention, paperboard with higher strength can be obtained even with approximately same basis weight and further the biodegradability is excellent. Yet, it is seen that, with increasing formulating proportion of juice lees, both the strength and the biodegradability improve.

EXAMPLE 2

Hardwood pulp and juice lees of vegetable (carrot) from which foreign matters were removed were weighed so as the dry weights to become a proportion of 50 parts to 50 parts, respectively. These were placed in a disintegrating tank for raw materials and water was added to obtain a slurry-like mixture at a consistency of 0.5%. This was transferred into a molder vat and a tray-like vessel was formed on the molder while reducing the pressure of molder from inside. Following this, pressure was applied from inside against the molded article on molder to detach the molded article from said molder. This was placed in a dryer and dried to a moisture content of about 35%, then it was dried under pressure with hot press to obtain a paper tray being a molded vessel made of paper.

Since this paper tray can be produced in the same process as the case of 100% conventional pulp, the production cost is equal to that of conventional one, but, because of higher strength, it was a harder and stiffer tray compared with conventional paper tray.

EXAMPLE 3

Using hardwood pulp and lees of apple juice, a slurry-like mixture at a consistency of 2.5% was obtained similarly to Example 2. Next, for affording the water resistance to final paper product, 0.5% of rosin size were added to this mixture. After stirring, 3.0% of aluminum sulfate were added and the mixture was further stirred. Then, it was transferred into a consistency-adjusting tank, and similar procedure to Example 2 was performed thereafter to obtain a paper tray with water resistance.

This tray is also superior in the convenience on use, because of higher strength and more hardness over a water-resistant tray of 100% pulp.

EXAMPLE 4

Upon producing multiply board on a conventional paper machine using bleached softwood pulp, the top paper layer was produced from paper comprising an easily biodegradable mixture by mixing strained lees of apple juice, from which skin and seeds were removed, with said softwood pulp. At this time, due to the natural color of liquid component contained in the strained lees and the pattern formed by fibers of apple and because of the capability of changing the color and pattern depending on the formulating proportion, it was possible to produce a paper with decorativeness without passing through the process of printing. At this time, for the purpose of further affording the oil resistance or water resistance depending on the uses, oil resistant agent or sizing agent is added.

And, using the paperboard produced as a material, tablewares such as dish, bowl and cup, paper container and corrugated board case were molded. As a result, unique color and pattern were formed automatically by the fibers of apple, thereby giving characteristic packaging vessels.

Since the composite of the invention allows to use strained lees of juice being wastes of fruits and vegetables and also fruits and vegetables of poor commercial value in the market, it has an advantage of aiming at the effective utilization of resources. Moreover, the paper products obtainable from said composite are more beneficial in cost and further have higher strength compared with paper products of 100% pulp, hence they have a large utility value in the agriculture and industry and in the distribution. In addition, because of good biodegradability on disposal, they exert remarkable effect also in the aspect of environmental protection.

What is claimed is:

1. An easily biodegradable composite comprising cellulosic fibers selected from the group consisting of wood pulp and recycled wood pulp and mixtures thereof, and fruit or vegetable fibers selected from the group consisting of apple, citrus, carrot, tomato, cabbage, celery fibers, and mixtures thereof.

2. A paper or paperboard produced from the easily biodegradable composite of claim 1.

3. The paper or paperboard of claim 2, wherein the proportion of fruit or vegetable fibers in the easily biodegradable composite is 50% or less by weight.

4. The paperboard of claim 2, which contains a top layer and wherein at least the top layer is made of paper comprising the easily biodegradable composite.

5. A method of producing paper or paperboard comprising the step of making paper or paperboard from the easily biodegradable composite of claim 1.

6. A paper product obtainable by molding the paper or paperboard of claim 2 as a base stock.

7. A molded vessel produced from the easily biodegradable composite of claim 1.

8. The molded vessel of claim 7, wherein the proportion of fruit or vegetable fibers in the easily biodegradable composite is 50% or less by weight.

9. An easily biodegradable composite comprising cellulosic fibers selected from the group consisting of wood pulp and recycled wood pulp and mixtures thereof, and fruit or vegetable fibers selected from the group consisting of strained lees of juices of fruits and vegetables.

10. A paper or paperboard produced from the easily biodegradable composite of claim 9.

11. The paper or paperboard of claim 10, wherein the proportion of fruit or vegetable fibers in the easily biodegradable composite is 50% or less by weight.

12. The paperboard of claim 10, which contains a top layer, and wherein at least the top layer is made of paper comprising the easily biodegradable composite.

13. A method of producing paper or paperboard comprising the step of making paper or paperboard from the easily biodegradable composite of claim 9.

14. A paper product obtainable by molding the paper or paperboard of claim 10 as a base stock.

15. A molded vessel produced from the easily biodegradable composite of claim 9.

16. The molded vessel of claim 15, wherein the proportion of fruit or vegetable fibers in the easily biodegradable composite is 50% or less by weight.

* * * * *

UNITED STATES PATENT AND TRADEMARK OFFICE
CERTIFICATE OF CORRECTION

PATENT NO. : 5,759,704
DATED : June 2, 1998
INVENTOR(S) : Hajime HORIUCHI, et al.

It is certified that error appears in the above-identified patent and that said Letters Patent is hereby corrected as shown below:

On the title page, item [75], the second inventor's name should be:

--Teruo SHIMIZU--

Signed and Sealed this

Twenty-fourth Day of November, 1998

Attest:

BRUCE LEHMAN

Attesting Officer

Commissioner of Patents and Trademarks